Aug. 4, 1959
A. BRUEDER
2,898,430
INDUCTION HEATING DEVICES
Filed March 7, 1958
3 Sheets-Sheet 1
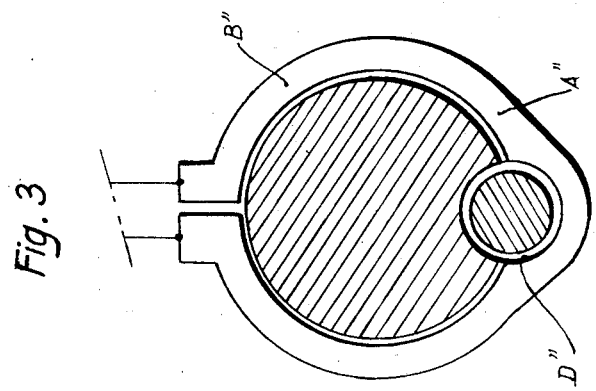
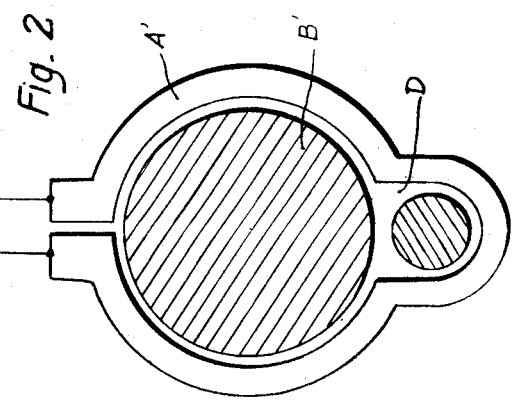
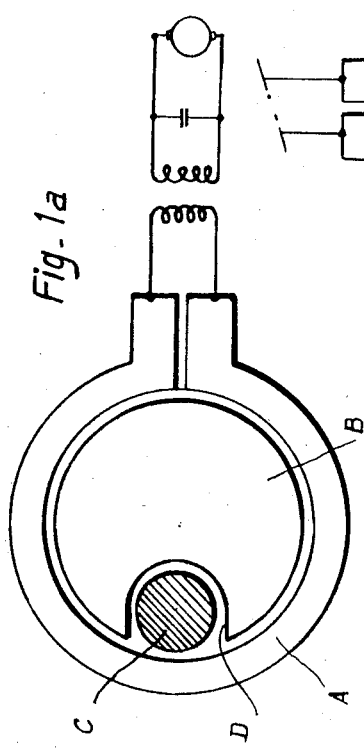
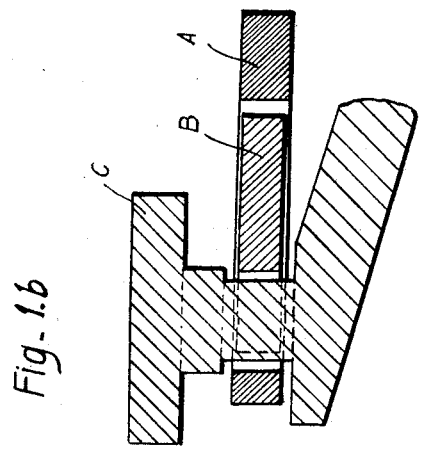

Aug. 4, 1959  A. BRUEDER  2,898,430
INDUCTION HEATING DEVICES
Filed March 7, 1958  3 Sheets-Sheet 2
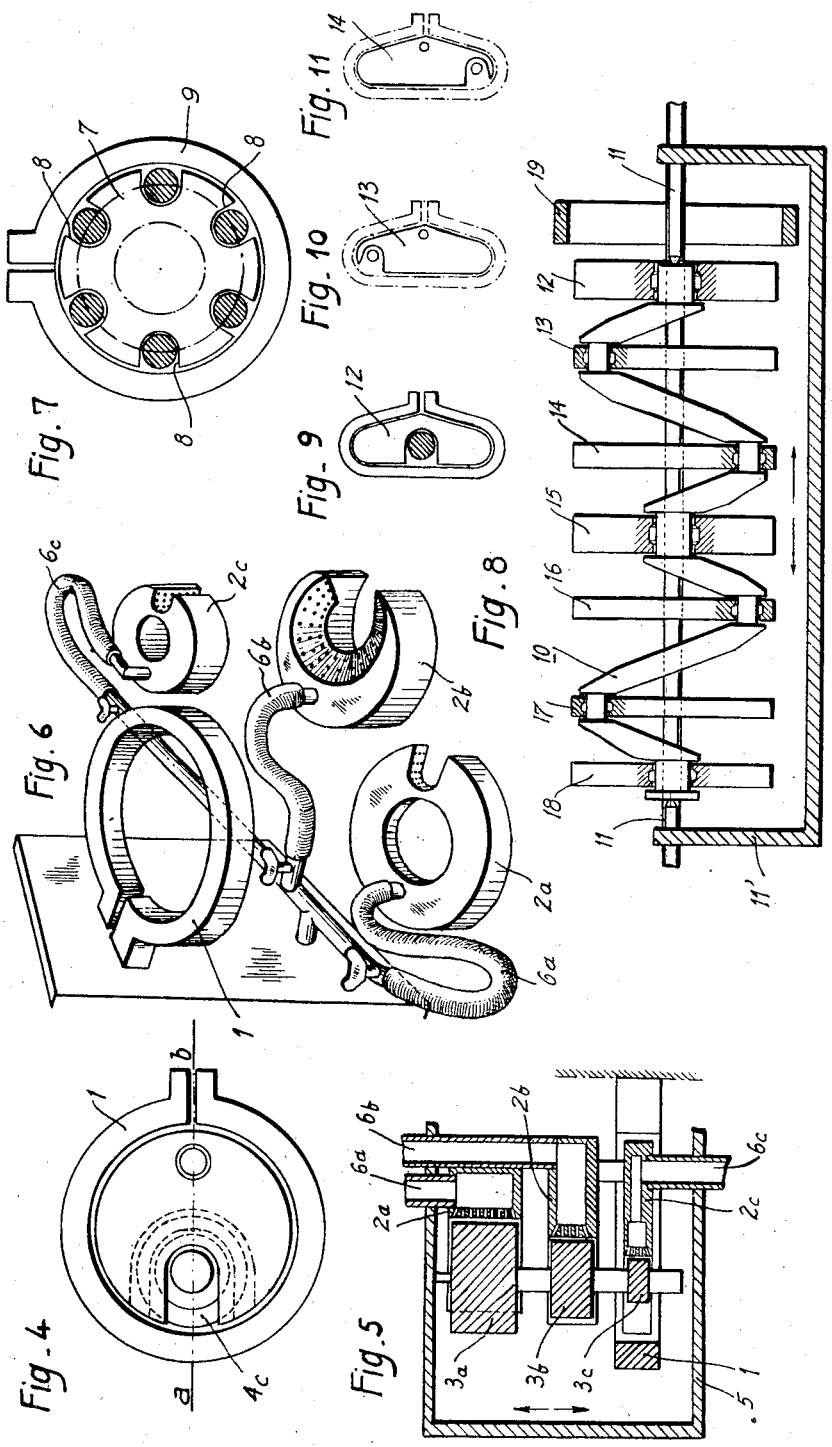

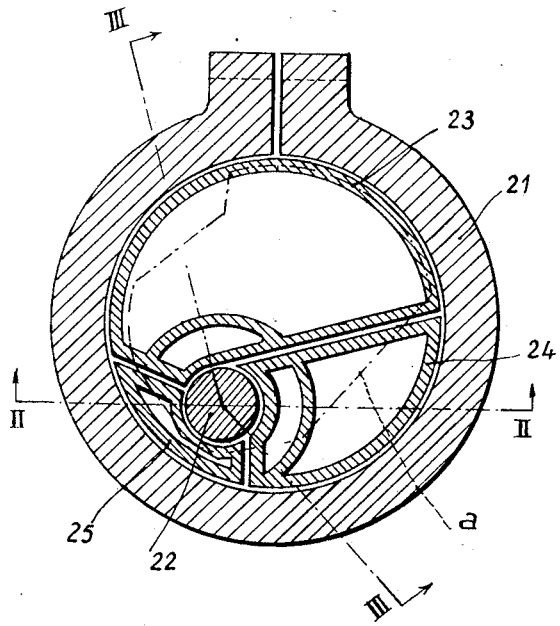
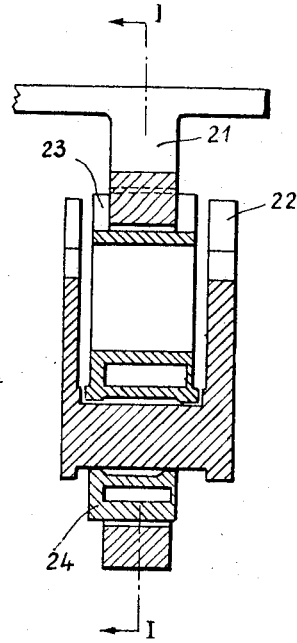
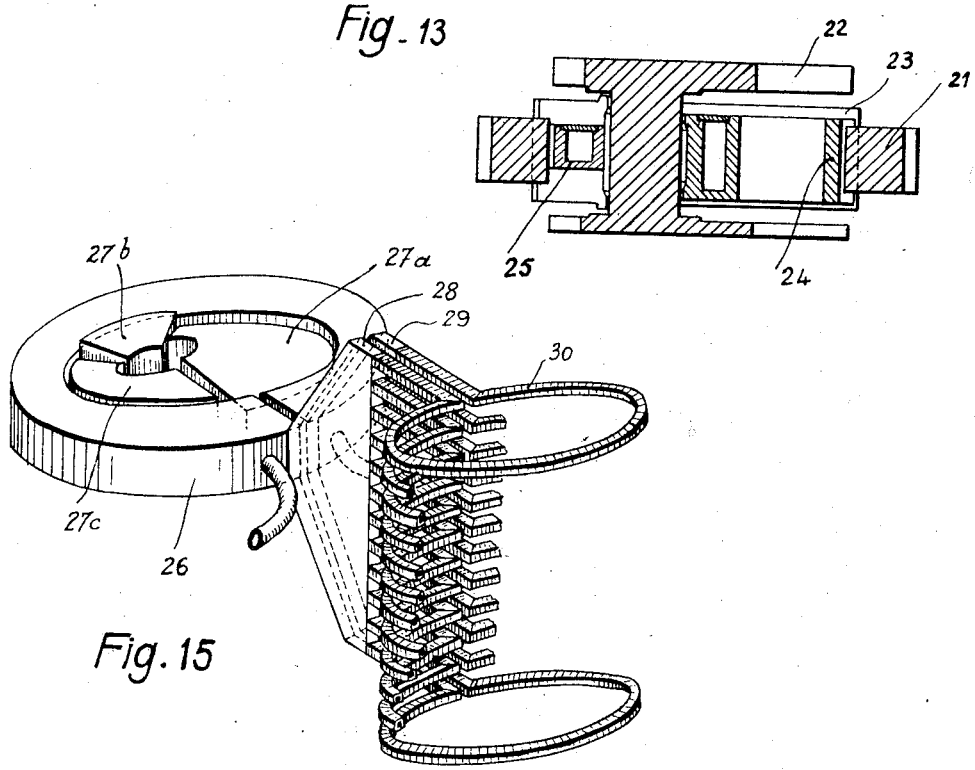

United States Patent Office 2,898,430
Patented Aug. 4, 1959

2,898,430

INDUCTION HEATING DEVICES

Antoine Brueder, Paris, France, assignor to Societe Anonyme Andre Citroen, Paris, France, a corporation of France Application March 7, 1958, Serial No. 719,971

8 Claims. (Cl. 219—10.49)

The present invention relates to induction heating devices and is concerned with improvements in devices of this general character.

In the technique of high-frequency and intermediate-frequency induction heating, inductors consisting of one or more wire or strip turns surrounding the part to be heated are utilized, the surface of the part constituting the secondary of a transformer. To obtain a proper induction coupling care is taken to reduce to a few millimeters the clearance between the inductor and the part. In certain cases the inductor is provided with lugs.

When the workpiece or part, due for instance to its shape, the dimenisons of its end portions, its eccentric axis, and/or other causes, cannot be introduced in the inductor adapted to fit on the zone to be heated, a so-called compound inductor made of several component elements adapted to be disassembled is used.

In this case the contacts interconnecting the component elements of the inductor must be made of special materials and constantly kept in proper operating conditions due to the high density of the currents flowing therethrough.

The heating device according to this invention consists on the one hand of an inductor having a relatively large diameter but of conventional construction, through which the workpiece or part to be treated is adapted to be introduced freely, and on the other hand of a non-magnetic metal block or mass also adapted to be introduced in the inductor and shaped to fill in the free space left between the inductor and the zone of the part which is to be heated, in order to reduce the reactance of the inductor.

In its simplest embodiment, this non-magnetic mass fills in the inner space of the ring inductor or "loop," a small clearance being left between its outer contour and the inductor proper; in addition, this mass has its outer peripheral portion formed with a notch or recess adapted to contain the part to be heated. This part also fits in this cavity with a clearance of the order of those currently used in intermediate-frequency and high-frequency heating.

It is not necessary that the notch or recess lies exactly on the outer peripheral contour of the compensating mass; in this case, the notch is connected to the outer contour by a gap joining the bore with the outer contour and permitting the easy passage of the part; this notch may also be formed on the inductor itself.

On the other hand, with the present invention, it is possible to reduce to a substantial extent the cost of tool equipment of a workshop by utilizing a small number of inductors having relatively large diameters and different thicknesses for static hardening and an inductor for series processing, together with compensating members that can be easily machined from bar stock without resorting to any complicated machining steps and to the forging of connecting lugs.

This advantage is completed by the fact that it is possible to carry out in successive steps and without any prior disassembling operation the heating of parts having a succession of different diameters, which cannot be normally treated with satisfactory results by using a single inductor.

It is also advantageous according to this invention to synchronize the displacement of the workpiece or part to be treated in the inductor with the travel of the compensating members, whereby the treatment of a workpiece or part comprising portions of different diameters to be treated successively can be effected by simply displacing in the inductor the part equipped at the proper locations with compensating members. Furthermore, these compensating members may advantageously be equipped with hydraulic circuits in view of either cooling them or effecting a hardening treatment by sprinkling or wetting; in this case, it is advantageous to connect these compensating members permanently with a water supply, for example through the intermediary of automatic or hand-controlled cocks or valves.

Finally, when workpieces having certain geometrical shapes are to be heated, it has proved advantageous to constitute the compensating reactor in the form of a plurality of elements fitting in the inductor without any electric contact to facilitate the insertion or removal of the workpiece or part to be heated; the essential requirement in this case being that the clearance between the inductor and the induced part must be filled with elementary compensating reactors each consisting of a conducting mass of sufficient thickness and adequate height.

Experience teaches that different metals may be used in the manufacture of each of these reactors, provided that only non-magnetic metals are used.

The efficiency of these assemblies is of the same order as that of unitary or one-piece inductors fabricated for a same part to be heated.

Finally, with the present invention it is possible, in case of a heating step performed during a hardening process, to associate a separate water sprinkler with each of these reactors.

In order to afford a clearer understanding of the present invention and of the manner in which the same may be carried out in the practice, reference will now be made to the accompanying drawings forming part of this specification and illustrating diagrammatically by way of example a few typical embodiments of the invention. In the drawings:

Figures 1a and 1b are a plane view and an axial sectional view respectively showing an inductor constructed in accordance with the teachings of this invention;

Figure 2 is a plane view showing a modified embodiment of the device of Figs. 1a and 1b;

Figure 3 is a plane view showing another modified embodiment of the device;

Figure 4 is a plane view showing an induction heating device comprising a single inductor ring and a plurality of compensating elements;

Figure 5 is a section taken upon the line a—b of Fig. 4;

Figure 6 is a perspective view illustrating an installation equipped with a stationary inductor and a plurality of detachable compensating members of different shapes, whereby different workpieces or parts can be treated either statically and simultaneously, or on a conveyor travelling past the installation;

Figure 7 is a plane view illustrating an inductor permitting the simultaneous heating of several parts;

Figure 8 is an elevational view showing an inductor designed more particularly for the thermal treatment of a crankshaft;

Figures 9, 10 and 11 are lateral views illustrating the different compensating members and the inductor;

Figure 12 is a front elevational and cross-sectional view illustrating an inductor equipped with a plurality of elementary compensating members;

Figure 13 is a section taken upon the line II—II of Fig. 12;

Figure 14 is another section upon the broken line III—III of Fig. 12; and

Figure 15 illustrates the assembly comprising a conducting ring and the secondary of the associated transformer constituting an integral unit.

Reference will be made firstly to Figs. 1a and 1b of the drawings which illustrate diagrammatically by way of example a typical arrangement of the component elements of an inductor consisting of two elements A and B adapted to heat by induction a part or workpiece C which, in the case illustrated, consists of a cylindrical pin disposed between two larger masses or flanges that cannot pass through an inductor of conventional design suitable for the diameter of this pin.

According to this invention, the induction heating device comprises an inductor A having an inner diameter sufficient to permit the passage of one of the flanges or masses of the part C, the free space being filled by a suitably shaped complementary member B fitting with a small clearance inside the part A and formed with peripheral notch or recess D permitting the passage of the pin portion of the workpiece C and consisting of non-magnetic metal.

During the heating process the device of this invention has the same electrical characteristics, and an efficiency of the same order as those of a conventional-type inductor constructed for treating a smooth cylindrical shaft of same diameter as the pin of part C.

The complementary member B may comprise—in a manner substantially similar to the construction of inductors designed for instance for thermal treatments—the whole or part of the hydraulic circuits for cooling or hardening purposes, according to the usual static or travelling treatment method.

Figure 2 illustrates another device wherein the notch D', instead of being located within the peripheral limits of the complementary member B', is adjacent to the bore of the ring A'.

Figure 3 illustrates another embodiment wherein this notch D'' is formed partly in member A'' and partly in member B''.

Anyone of these different arrangements may be selected according to mechanical requirements, the efficiency constantly remaining within very close limits. The angular position of the inductor slot and of the aforesaid notch is immaterial and will not affect the quality of the heating process.

Inductors with compensating members may be associated as in conventional inductors with strips or lugs, especially in the zone where the workpiece is accommodated.

In the embodiments illustrated in Figs. 1 to 3 the complementary or compensating reactor members B consist of cylindrical blocks with or without workpiece-receiving notches, their plane end faces being parallel and solid and their thicknesses corresponding to that of the inductor.

Experience teaches that the mass or block B can be bored, provided that the wall thickness of this member is maintained at a value consistent with the frequency of the induction current.

According to the specific requirements characterizing the parts to be heated, the thickness of the masses B, B', B'' may be equal to, greater or lower than, that of the inductor, and the cylinder ends may be other than plane and parallel.

The shape of the heating zone is obviously subordinate not only to those of the inductor and compensating reactor, but also to the relative positions of these elements. Within certain limits, it is also possible to arrange the reactor outside the inductor bore.

It is good practice to make the block or mass B of highly-conducting copper but this choice is not compulsory.

Of course, this induction device may be used for any heating operations, whether the part is to be prepared for forging, welding, brazing processes and other thermal treatments.

Referring now to Figs. 4 and 5 of the drawings, these figures illustrate a modified device according to this invention which consists of an induction ring 1 and a plurality of compensating members 2a, 2b, 2c for treating various portions 3a, 3b, 3c of different dimensions of a same workpiece.

To this end, the outer diameters of the members 2a, 2b, 2c fit in the inner diameter of the ring and the marginal portions of these members are formed with recesses such as 4c adapted to receive the relevant portion of the workpiece to be treated.

In the embodiment illustrated, the inductor 1 is stationary and the workpiece is disposed between centre points within a bracket 5 also adapted to maintain in proper position the compensating members 2a, 2b and 2c. The assembly may displace in the axial direction in order successively to bring the members 2a, 2b, 2c inside the ring 1.

As shown in the drawings, the compensating members 2a, 2b, 2c are each provided with inner ducts permitting the circulation of a cooling fluid, preferably water, that can be sprinkled through small orifices, as illustrated, for hardening, tempering, quenching or like purposes; these ducts are connected to water supply hoses 6a, 6b, 6c equipped with control cocks.

Figure 6 shows in perspective the induction ring 1 and the compensating members connected to a water supply manifold.

Figure 7 of the drawings illustrates a specific embodiment of a compensating member 7 having a plurality of notches 8 formed at spaced intervals in the marginal portion of this member to permit the simultaneous treatment of several workpieces in a common induction ring 9.

Referring now to Fig. 8 of the drawings, the device shown therein is designed more particularly for the induction heating of certain portions of a crankshaft 10. This crankshaft 10 is mounted between centre points 11 on a sliding carriage 11' displaceable longitudinally and provided with compensating members 12 to 18 for treating the crankpins and journals of the crankshaft; these members, as shown more particularly in Figs. 9, 10 and 11 are formed with notches or recesses, each adapted to receive a crankpin or a journal; besides, the external contour of these members is shaped to fit inside a stationary induction ring 19. In this specific embodiment it will be seen that the interfitting shapes of the ring and complementary members, also of non-circular shape, are such that these elements fit in each other without requiring at each displacement a rotation of the crankshaft to permit the successive engagement of each complementary member in the induction ring. This may easily be obtained by giving to the ring 19 and therefore to the complementary members the minimum contour enabling it to fit simultaneously on the different portions to be treated, and forming in each complementary member a notch at a location corresponding to one of the projections—in the thus defined surface—of the different portions to be treated.

Referring finally to Figs. 12, 13 and 14 of the drawings, this arrangement comprises between the inductor 21 and the workpiece 22 to be treated a plurality of elementary reactors 23, 24, 25 electrically isolated from one another; these elementary reactors 23, 24 and 25 are shaped to fill in the space between the inductor and the workpiece. With this arrangement the insertion of the workpiece in the inductor is particularly easy and it is advantageous to use this arrangement when the shape of the workpiece is such that the use of a single reactor is either impossible or very difficult.

Assemblies of this general character can be utilized for any heating operation, whether for preparing a part in view of a subsequent forging, welding, brazing or like step, or for any other desired thermal treatment.

The elementary reactors 23, 24, 25 and the inductor 21 are provided according to requirements with water cooling and/or sprinkling means as normally used in known arrangements.

Thus, the invention permits an easy, economical and practical construction of an assembly comprising an inductor and a compensating member consisting of several interfitting component elements, for heating by means of intermediate-frequency or high-frequency current workpieces that cannot be inserted in the loop of a one-piece inductor even if it is properly designed for fitting on the portion of the workpiece which is to be heated.

The specific advantages characterizing the induction device of this invention may be summarized as follows:

(a) Lower initial cost of tools and subsequent lower cost of tool replacement when different workpieces are heated on a same machine;

(b) Possibility of successively heating different portions of a same workpiece of widely differing diameters without changing the inductor;

(c) Possibility of easily, simultaneously and uniformly heating a plurality of workpieces;

(d) Use of elements that do not require any electric contact with the general induction circuit and can be connected permanently to the general water supply circuit of the installation if necessary.

In fact, this constitutes a substantial advantage of the invention. Up to now, in conventional induction heating devices, the inductors were screwed or clamped by screws or clamps on the free ends or terminal members of the secondary of a special high-frequency transformer. These connections had to be made very carefully to avoid any arcing likely to rapidly deteriorate the contact surfaces.

By utilizing the inductors with compensating reactors according to this invention, the use of screwed or clamped connecting devices can be avoided, as the compensating reactors made of one or more members are assembled in a ring-shaped inductor rigidly connected to the high-frequency secondary circuit.

This ring-shaped inductor is calculated according to the known principles of single-turn inductors and in such a manner that a convenient coupling can be effected in view of obtaining the highest heating efficiency; its inner diameter will be slightly greater than that corresponding to the maximum efficiency of the selected high-frequency transformer.

Thus, for example, the inner diameter of the induction ring will be 125 millimeter with a 10,000-cycle generator of 150 kw. and 220 v. feeding a transformer capable of a variable or fixed ratio of up to 10:1; this example is applicable more particularly to a surface-hardening apparatus.

Figure 15 illustrates a complete induction ring 26 containing compensating members 27, 27b, 27c having their ends connected through a pair of conducting elements 28, 29 forming an integral part of this ring to the terminals of the various turns 30 of the secondary of the transformer associated therewith.

As provided by this invention, the conducting ring and the secondary turns constitute a rigid, unitary assembly whereby any detachable connections may be dispensed with.

Of course, many modifications and alterations may be brought to the few embodiments shown and illustrated herein by way of example, it being understood that these embodiments are given by way of example only and should not be construed as limiting the scope of the invention as set forth in the appended claims.

I claim:

1. An induction heating apparatus for heating workpieces, which comprises an induction ring having associated therewith a plurality of complementary compensating elements fitting successively between the inner periphery of said ring and the portions of the workpiece to be treated, and means mounting said elements for displacement simultaneously for following the displacement of the workpiece through the induction ring.

2. Induction heating device according to claim 1, wherein the space required for inserting the workpiece portion to be heated lies completely within a notch or recess formed in the complementary compensating member.

3. Induction heating device according to claim 1, wherein the space required for inserting the workpiece portion to be heated lies completely within a notch or recess formed in said inductor.

4. Induction heating device according to claim 1, wherein the space required for inserting the workpiece portion to be heated lies partly in said inductor and partly in said complementary compensating member.

5. Induction heating device according to claim 1, wherein said complementary compensating member is formed with bores.

6. An induction heating apparatus for heating workpieces, which comprises an induction ring having associated therewith a plurality of complementary compensating elements fitting successively between the inner periphery of said ring and the portions of the workpiece to be treated, said elements being adapted on the one hand to be connected to a water supply for cooling, or complementing the thermal treatment of, the workpiece portions to be treated, and on the other hand to be displaced simultaneously for following the displacement of the workpiece through the induction ring.

7. An induction heating apparatus according to claim 6, comprising an induction ring and at least one compensating member complementary to said ring, said compensating member having formed therein a plurality of notches for the simultaneous treatment of a plurality of workpieces or workpiece portions.

8. An induction heating apparatus according to claim 6, comprising an induction ring and a compensating complementary member consisting of a plurality of elements adapted to interfit or be juxtaposed in said induction ring, without requiring any electric contact between said elements for effecting a heating operation.

References Cited in the file of this patent

UNITED STATES PATENTS

| 2,442,968 | Bierwirth | June 8, 1948 |
| 2,485,843 | Pinkney | Oct. 25, 1949 |

FOREIGN PATENTS

| 633,045 | Great Britain | Dec. 5, 1949 |
| 650,184 | Great Britain | Feb. 14, 1951 |